United States Patent [19]
Glucksman et al.

[11] Patent Number: 5,584,233
[45] Date of Patent: Dec. 17, 1996

[54] AUTOMATIC BREAD-MAKING APPARATUS

[75] Inventors: Dov Z. Glucksman, Wenham; Karl H. Weidemann, Hull, both of Mass.

[73] Assignee: Appliance Development Corp., Danvers, Mass.

[21] Appl. No.: 503,652

[22] Filed: Jul. 18, 1995

[51] Int. Cl.⁶ .................................................. A47J 37/01
[52] U.S. Cl. ................ 99/348; 99/447; 99/474; 126/21 A
[58] Field of Search ................ 99/473, 474, 475, 99/348, 476, 470; 126/21 A, 21 R, 19 R, 39 C, 273 R; 219/400

[56] References Cited

U.S. PATENT DOCUMENTS

| | | | |
|---|---|---|---|
| 4,071,738 | 1/1978 | Jenn et al. | 99/447 |
| 4,457,292 | 7/1984 | Jorgensen et al. | 126/21 A |
| 4,561,348 | 12/1985 | Halters et al. | 99/447 |
| 4,601,279 | 7/1986 | Guerin | 126/21 A |
| 4,776,265 | 10/1988 | Ojima | 99/348 |
| 4,824,644 | 4/1989 | Cox et al. | 126/21 A |
| 4,829,158 | 5/1989 | Burnham | 126/21 A |
| 4,870,254 | 9/1989 | Arabori et al. | 126/21 A |
| 4,903,587 | 2/1990 | Nagasaka et al. | 126/21 A |
| 4,951,559 | 8/1990 | Arao et al. | 99/348 |
| 5,029,519 | 7/1991 | Boyen | 99/341 |
| 5,076,153 | 12/1991 | Takahashi et al. | 99/327 |
| 5,142,125 | 8/1992 | Fioroli et al. | 126/21 A |
| 5,193,520 | 3/1993 | Gostelow et al. | 126/21 A |
| 5,205,274 | 4/1993 | Smith et al. | 126/21 A |
| 5,351,606 | 10/1994 | Matsuzaki | 99/348 |
| 5,392,695 | 2/1995 | Junkel | 99/328 |
| 5,410,949 | 5/1995 | Yung | 99/348 |
| 5,426,580 | 6/1995 | Yoshida et al. | 364/143 |

FOREIGN PATENT DOCUMENTS

| | | | |
|---|---|---|---|
| 463657 | 1/1992 | European Pat. Off. | 99/447 |
| 1930 | 1/1984 | Japan | 126/21 A |
| 300121 | 12/1989 | Japan | 126/21 A |
| 20572219 | 2/1990 | Japan | 99/470 |
| 202333 | 11/1994 | Japan | 126/21 A |

*Primary Examiner*—David Scherbel
*Assistant Examiner*—Tony G. Soohoo
*Attorney, Agent, or Firm*—Sofer & Haroun, LLP

[57] ABSTRACT

An automatic bread making apparatus is provided, the apparatus having a housing having an interior surface, a baking chamber having interior and exterior surfaces, and a baking pan fabricated from a heat-resistant material. The baking chamber is positioned within the housing to form an air space between the interior surface of the housing and the exterior surface of the baking chamber. The baking chamber is also provided with an openable transparent top cover. The baking pan is positioned within the baking chamber to define an air space between the interior surface of the baking chamber and the baking pan. A first impeller is provided to supply and circulate heated air within the air space defined between the interior surface of the baking chamber and the baking pan. A second impeller is provided to supply cool air to the space defined between the interior surface of the housing and the exterior surface of the baking chamber.

21 Claims, 4 Drawing Sheets

AUTOMATIC BREAD-MAKING APPARATUS

FIELD OF THE INVENTION

The present invention relates generally to a bread-making apparatus wherein the apparatus automatically kneads the dough, allows the dough to rise and then bakes the raised dough into a loaf of bread from pre-specified ingredients filled into a baking pan and, more particularly, to an apparatus configured to prepare and to deliver a uniformly and evenly baked loaf of bread at a predesignated hour of the day, independent of the time the bread making was started.

BACKGROUND OF THE INVENTION

During the past ten years, various different kinds of bread-making machines have been introduced into the consumer market. All of these bread-making machines automatically mix and knead dough once the necessary ingredients have been provided, let the dough rise and then bake the dough into a loaf of bread of a desired crispness. Electronic circuitry is integrated within the apparatus and can be programmed to execute the different steps in their certain desired order and timing depending on the kind of bread a user desires to bake. In this way, all the user has to do is to place the correct specified ingredients into the baking pan and to select the bread type corresponding to the ingredients.

Existing prior art bread-making machines essentially include, a baking pan, a kneading blade provided in the bottom portion of the baking pan and an electric motor which rotates the kneading blade for a predetermined period of time. The pan, which has an open top, is removable from the appliance in order to extract the ready loaf from the pan as well as for cleaning purposes. The pan is surrounded by a baking chamber, the baking chamber being provided with an open top portion which is tightly closed by a cover during bread making. The baking chamber contains a heating element in its bottom portion which can be energized to the correct temperature and timing by the aforementioned electronic circuitry. The air heated in the baking chamber transmits the heat energy to the dough in the baking pan by natural convection through the open top portion and by conduction through the metallic walls. An outer housing encloses the baking chamber and contains, inter alia, the electric motor and drive for rotating the kneading blade, the electronic circuitry and a keyboard for selecting the suitable bread type.

Existing bread making machines have certain drawbacks. Some of these drawbacks include the fluctuations and uneven distribution of temperature in the baking chamber, with higher temperature air rising to the top and lower temperature air remaining near the bottom. As a result of this temperature differential, a prior art temperature sensor will not be able to de-energize the heater whenever the correct baking temperature has been reached, thus causing large temperature fluctuations during the baking process which result in the problems associated in baking of the bread i.e. uneven and incomplete baking. A second drawback is that the outer housing becomes excessively hot by the convection and radiation from the hot wall of the baking chamber during the long baking time. In view of this excessive heat, prior art machines require that the housing be made of metal instead of plastic material. As is obvious, a plastic housing is less costly and more aesthetically acceptable than a metal one. Additionally, in order to overcome the temperature fluctuations and the uneven temperature distributions described previously, most bread making apparatuses include a baking pan of heavy die-cast aluminum adding considerably to the total cost of the appliance.

It is the main object of the present invention to eliminate these drawbacks and to provide a bread-making apparatus wherein the air surrounding the baking pan remains at a substantially uniform temperature during the entire baking process.

It is another object of the present invention to increase the heat transfer to the dough in the baking pan by providing hot air flow along the metallic walls of the baking pan, thereby accelerating the baking process and shortening the baking time. By providing air flow around the metallic walls of the baking pan, it becomes possible to replace the previously mentioned heavy baking pan by a low-cost thin-walled pan altogether.

It is a further object of the invention to provide means for cooling the outside of the baking chamber and thereby prevent the outer casing from being heated to an unpleasantly high degree.

It is an additional object of the invention to provide the apparatus with an outer housing made of a plastic material which results in a substantial cost reduction without the danger of a user being burned by an excessively hot surface.

Additionally, applicants incorporate by reference the disclosure of U.S. application Ser. No. 08/503,557, filed concurrently herewith and also entitled "AUTOMATIC BREAD-BAKING MACHINE".

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

SUMMARY OF THE INVENTION

A preferred embodiment of the bread making apparatus according to the present invention includes a baking pan and a motor-driven mixing blade, the blade being similar to those of conventional machines. The pan may be either cylindrical or block-shaped, open at its top and made of a heat-conductive metal such as aluminum. It is firmly, but releasably fastened to the bottom of the baking chamber, likewise of metal sheeting, which surrounds it on all sides in spaced-apart relationship. The baking chamber is provided with a top portion which can be tightly closed by a cover to be opened to give access to the baking pan and to the baking chamber. An oblong housing encloses the baking chamber in spaced relationship and is provided with an openable cover permitting access to the baking chamber. The baking chamber is positioned at one end of the oblong housing leaving a free space at the other end.

Hot air is circulated all around the baking pan for improving heat transfer and for heating of the entire pan surface to a uniform temperature. Cooler air is circulated through the space between the baking chamber and the outer housing in order to keep the housing in a cooler state relative to the baking chamber.

Both the circulation of the hot air around the baking pan and the circulation of the cool air through the space between the baking chamber and the outer housing are achieved by providing two blowers driven by a double-shaft motor horizontally mounted along a horizontal axis in the space between the baking chamber and the housing. Hot air circulation around the baking pan is effected by a centrifugal impeller mounted on the inner end of the motor and rotated in a shroud which is attached to one wall of the baking chamber and communicates with that chamber via a downwardly extending air duct which ends in an air outlet in the wall of the chamber close to its bottom end. A suction inlet is provided in the wall of the baking chamber which is in concentric alignment with the axis of the impeller. An open-coil electric resistor heater is mounted inside the air duct, and a temperature sensing element positioned in the hot air stream and preferably in the air duct between the impeller and the heater serves to control the heater in accordance with the temperature required at any time during each baking cycle. The heated air expelled from the air outlet close to the chamber bottom is directed by guide vanes to the space underneath the baking pan from where it rises to its top and is returned to the blower through the air inlet near the top of the pan. In this way, thorough and even circulation around the pan is effected and heat transfer is increased by the air flow along the pan walls.

The other shaft of the motor carries an axial impeller opposite an inlet opening in the wall of the housing, which draws cool air in from the outside and drives it through the space between the housing and baking chamber to an air outlet in the opposite housing wall. The cool air passes first over the electric motor carrying the impellers and effects cooling of the motor. From here it flows along the inside of the housing, thus preventing the housing from overheating, thus permitting the housing to be made of a plastic material.

The housing is of substantially rectangular cross section and is mourned on a base compartment of similar shape. As mentioned previously, the baking chamber enclosing the baking pan is mounted closer to one end of the housing thus leaving a larger free space at the other end which contains the air circulation assembly and a vertically positioned motor configured to rotate the mixing and kneading blade.

The shaft of this motor extends downwards in the base compartment and carries a small pulley which drives a large pulley on the shaft of the mixing and kneading blade by means of a belt drive, also enclosed in the base compartment. The large space on the side of the housing contains the electric controls and a micro-processor containing the different baking programs. A keyboard and display window are mounted above the micro-processor on top of the housing permitting ready viewing and operation by the user.

With the aim of facilitating access to the baking pan, the baking chamber extends up to the opening in the housing with its opening lying in an identical plane with the opening of the housing, the two openings being held in their relative spacial relationship by a frame made of a heat transfer attenuating material and being covered by a common cover made of a transparent material.

Bread baked by the apparatus of the present invention is more uniform than bread produced by the known bread makers owing to the fact that the pan is surrounded by air of uniform temperature and that heat transfer is improved by continuous air flow around the pan. This also permits a shortened bake time and substantial savings in energy consumption.

By cooling the inside of the housing, the housing is prevented from overheating by the radiation and convection from the surface of the baking chamber, thus permitting the housing to be manufactured of a plastic material, thereby reducing the total weight of the apparatus as well as its production costs. As well, by providing a resistor heater, such as a wire which is wound, coiled or looped around a piece of mica, a substantial reduction in the cost of the appliance compared with the cost of the sheathed tubular heating element necessary in conventional bread making machines is realized.

As a result of uniform air temperature and small fluctuations in baking chamber temperatures, it becomes possible to bake bread in a thin-walled metal pan, e.g. of aluminum or steel which is lighter, less costly and heats up faster than heavy die-cast aluminum pans provided in conventional bread makers.

BRIEF DESCRIPTION OF THE DRAWINGS

In the drawings, wherein like reference characters denote similar elements throughout the several views.

DETAILED DESCRIPTION OF THE DRAWINGS

Figure 1:
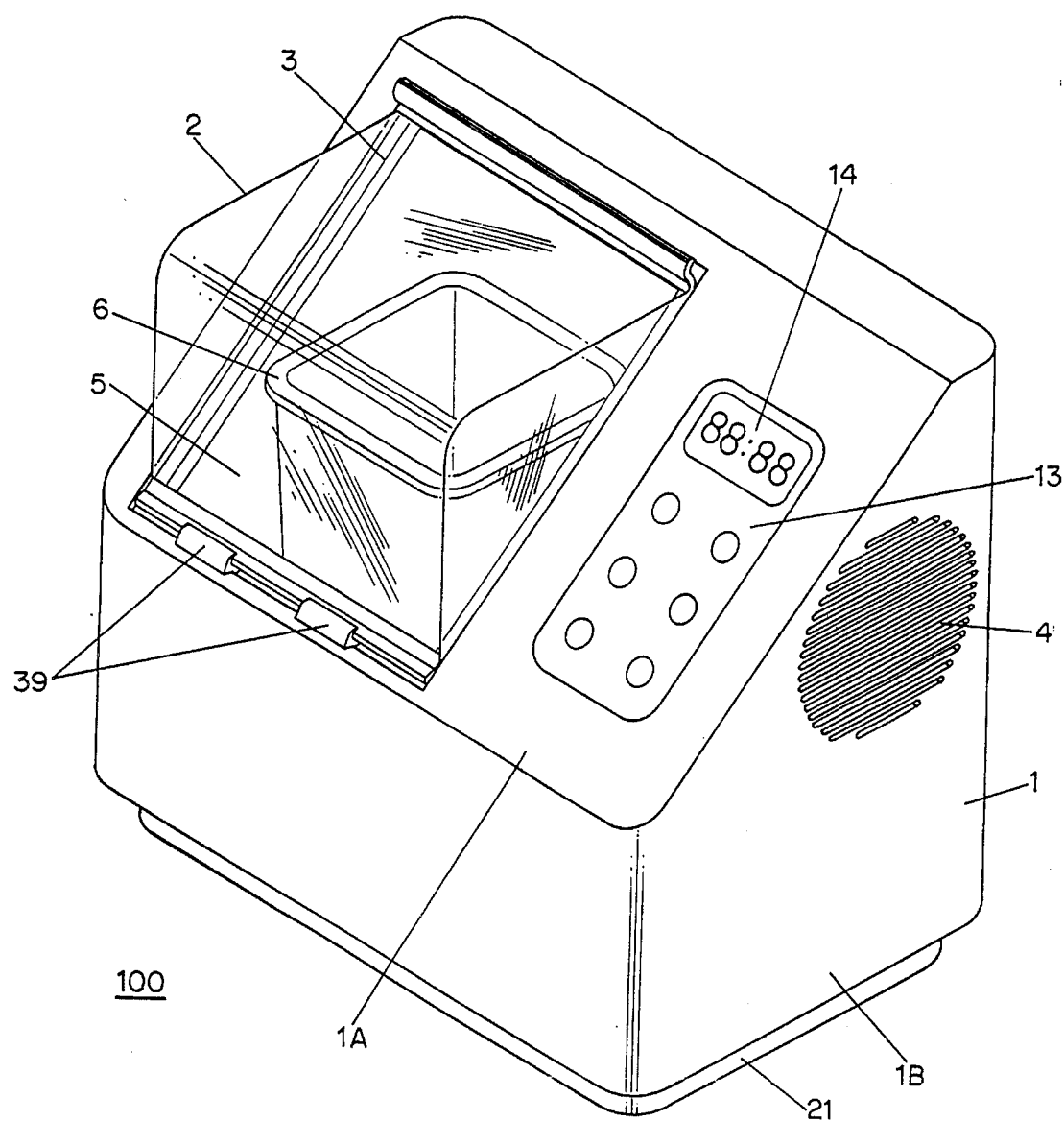
FIG. 1 is an isometric view of an embodiment of the bread making apparatus constructed in accordance with an illustrative embodiment of the invention.

Referring now to the drawings for a more detailed description of the present invention and more particularly to FIG. 1, a preferred embodiment of the bread making apparatus denoted generally as element 100 is shown. The bread-making apparatus 100 includes a box-shaped housing 1 having a forward sloping top surface 1A, this surface 1A being interrupted by a rectangular opening within a rectangular frame 3, which is normally closed by a hinged cover 2, made of a transparent and highly heat insulating material. A hinge 39 is integrally molded to the cover 2 and the housing 1 so as to permit opening and closing of the cover 2. Also shown is a baking chamber 5 which contains a baking pan 6. By opening the housing cover 2, the user has ready access to the baking pan 6 which is removable from the apparatus together with the well-baked bread (not shown). The housing 1 is mounted on a rectangular base compartment 21 which contains the drive of the kneading blade which will be described in detail. Also shown in FIG. 1 is a fresh-air inlet 4 on one side wall 1B of the housing 1.

The top portion 1A of the housing 1 is provided with a keyboard 13 and a display 14 located closely adjacent to the rectangular frame 3. The keyboard 13 permits the user to choose the mode of bread baking.

Figure 2:
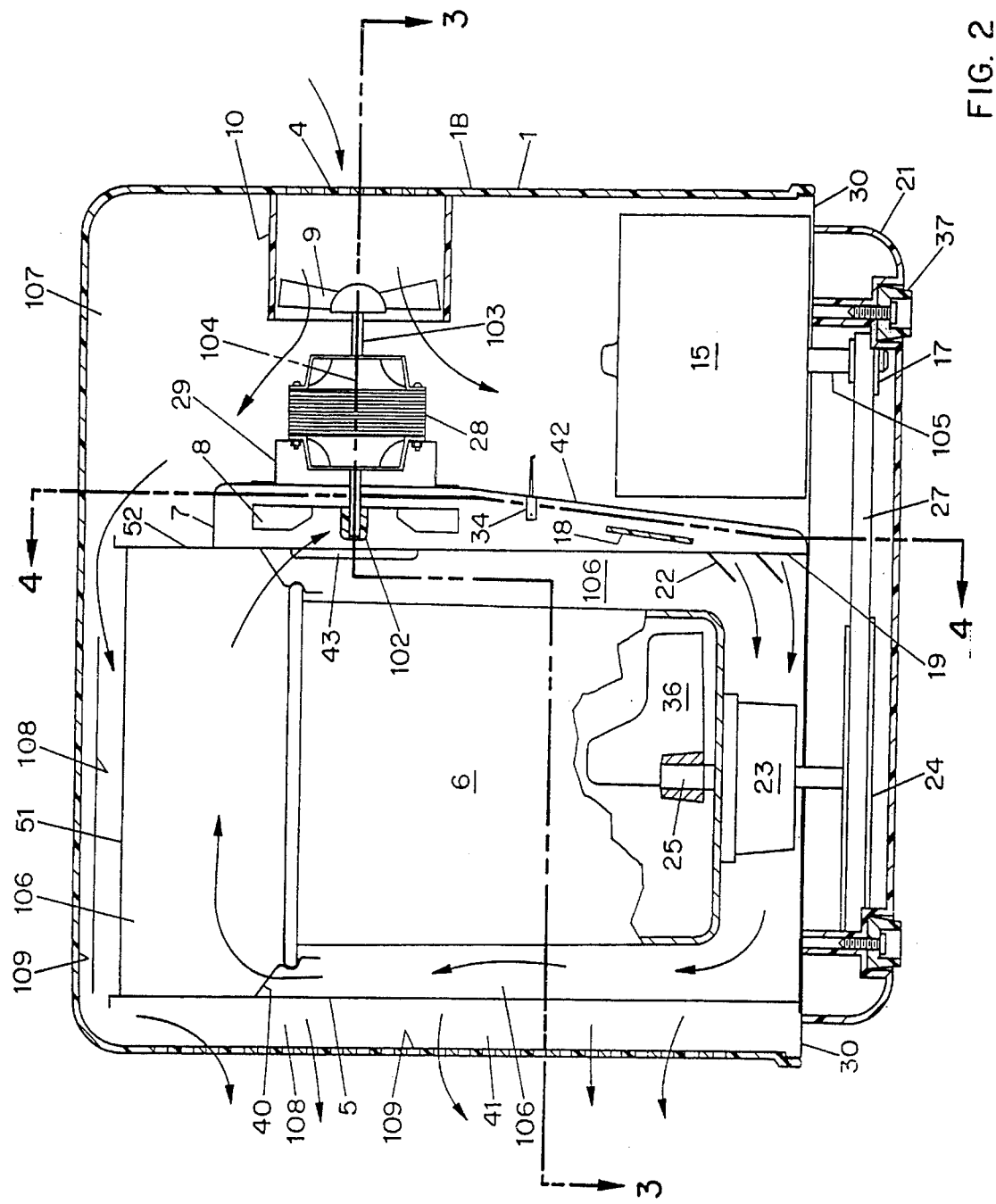
FIG. 2 is a vertical section of the bread making apparatus of FIG. 1.
Figure 3:
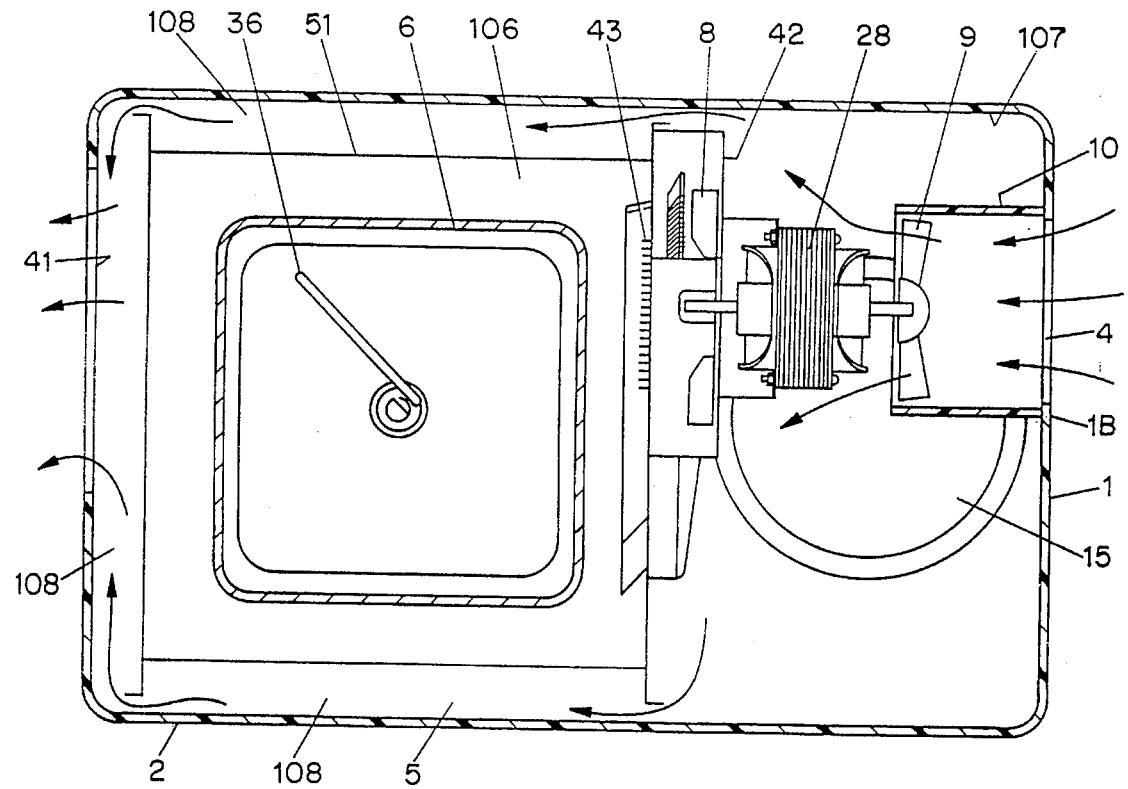
FIG. 3 is a section along line 3—3 of FIG. 2.
Figure 4:
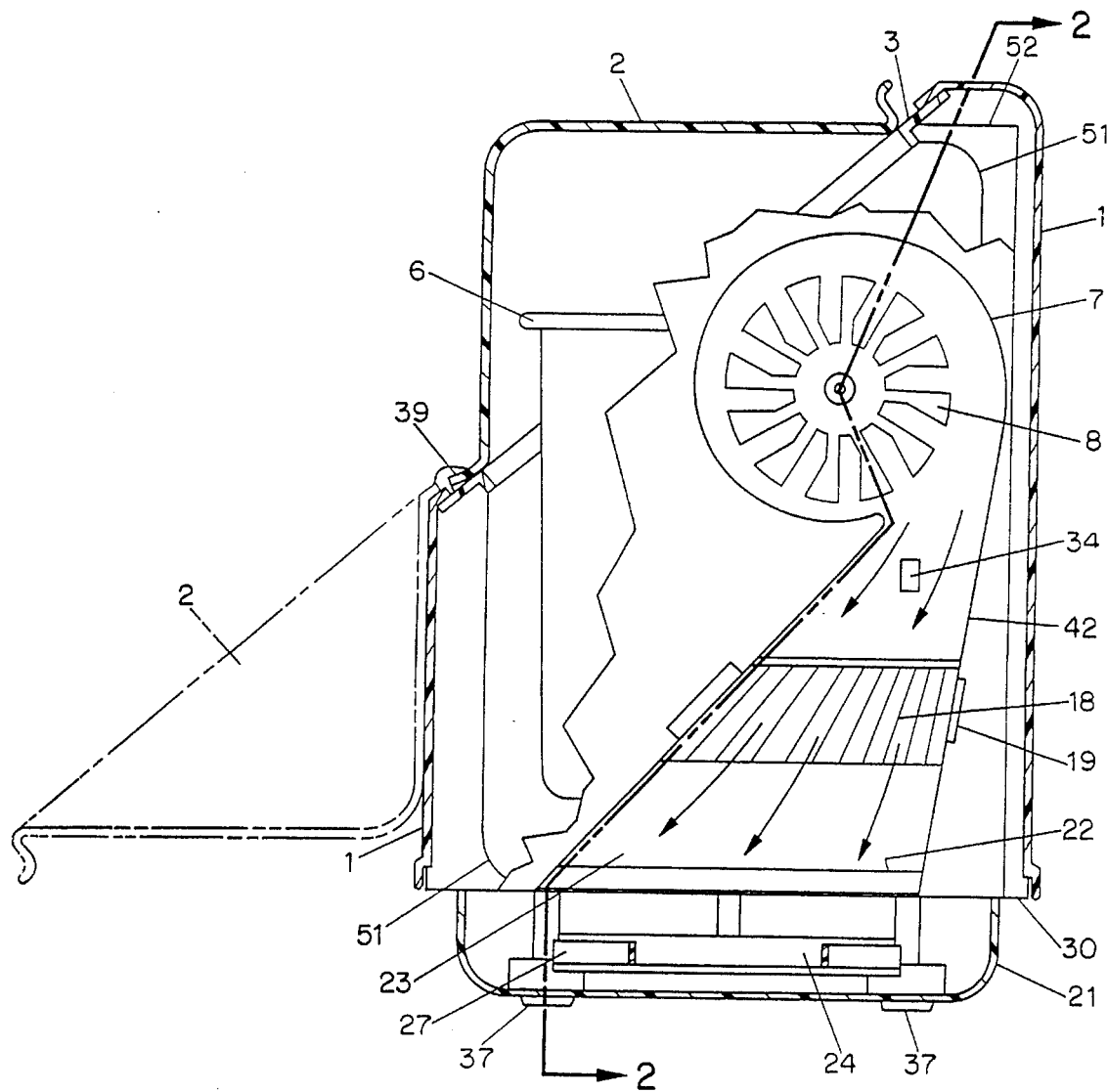
FIG. 4 is a section along line 4—4 of FIG. 2.

FIGS. 2, 3 and 4 disclose the details of the working mechanism of the bread making apparatus 100. A baking pan 6 of square cross section is firmly, but releasably fastened to the bottom of a baking chamber 5, with an air space 106 provided around the sides, the top and the bottom of the pan 6. A mixing and kneading blade 36 is mounted close to the bottom of the pan 6 on a vertical shaft 25 supported in a bearing housing 23 which also serves as a base for the pan 6. The bearing housing 23 includes means for holding the pan in firm connection, especially against rotation during the kneading process, and for releasing both pan and blade, thus permitting their lifting out of the apparatus for both removing the baked bread and for cleaning purposes. The mixing and kneading blade 36 is driven by an electric motor 15 via a belt drive 27, the motor 15 being vertically mounted on the bottom plate 30 on one side of the housing with its drive shaft 105 extending through the bottom plate 30 into the base 21. The belt drive 27 is enclosed in the base compartment 21 and includes a small-diameter pulley 17 mounted on the motor shaft and a large-diameter pulley 24 on vertical shaft 25. However, as is apparent to one skilled in the art, any type of torque transmitting means such as worm gearing, planetary gearing or sprocket gearing may be utilized.

The housing 1 is of rectangular cross section with the baking chamber 5 at one end of the rectangle, and with a space 107 at the other end which also accommodates the electric drive motor 15. The side wall adjoining this space 107 is perforated by the previously mentioned air inlet 4, covered by a grille, while the opposite end—close to the baking chamber 5—contains a wide open air outlet 41, likewise covered by a grille.

The baking pan 6 of the bread-baking apparatus 100 is heated by circulated hot air. The inside of the housing 1 and the outside of the baking chamber 5 are cooled by a continuous stream of fresh outside air. For this purpose, a double-shaft motor 28 mounted in horizontal position along a horizontal axis 104 in the side space 107 of the housing has a centrifugal impeller 8 mounted on the shaft end 102 remote from the air inlet 4 and an axial impeller 9 on the shaft end 103 close to the side wall 1B. The axial impeller fan 9 is mounted adjacent the inlet opening 4 in the wall. Cooling of the exterior side of the baking chamber 5 and the interior surface of the housing is effected by cool air flowing through the spaces 107, 108 between the housing 1 and the baking chamber 5. This cool air is drawn from the outside through air inlet 4 by axial fan 9. The cool air is expelled out of the housing at an opposite end through air outlet 41. Outside air is drawn in by axial fan 9 through a cylindrical shroud 10 connecting inlet 4 with the fan impeller, the air passing over the motor 28 and cooling it before flowing around the baking chamber 5. By providing this cool air circulation through space 108 between the baking chamber 5 and the inner surface 109 of the outer housing, this permits the outer housing 1 to be manufactured of a suitable low cost plastic material instead of the metal sheeting used in conventional bread makers, which allows for a considerable reduction in the cost of manufacturing of the appliance.

The baking pan 6 is heated by air circulation induced by the centrifugal impeller 8 enclosed in a blower housing 7, which is attached to the wall 52 of the baking chamber 5 and extends in the form of an obliquely downward extending duct 42 to a hot-air outlet 19 which is located proximate the bottom of the chamber. The air is heated by a heating element 18 positioned in duct 42 parallel to the air flow and is directed into the space underneath the baking pan 6 by guide vanes 22. From underneath the pan 6, the heated air flows around the sides 106 and over the top of the pan 6 to a return air port 43 in the baking chamber wall 51. The return air port 43 is in concentric alignment with the impeller axis 104.

Figure 5:
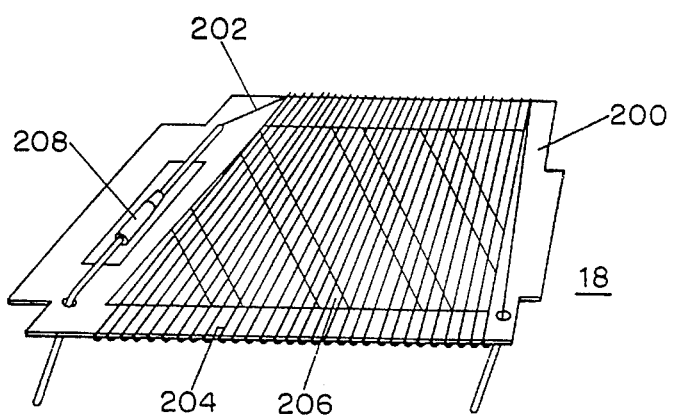
FIG. 5 is a plan view of the resistor heater as shown in FIGS. 2 and 4.

Referring specifically to FIG. 5, the heating element or resistor heater 18 is fabricated out of a mica board frame 200, the mica board having a thickness of approximately 0.065 inches. In this way, the heater wire 202 may be wound from end to end to form a plurality of substantially parallel loops of heater wire 204. Also as shown in FIG. 5, the mica board frame 200 may be provided with one or more supports 206 which provide rigidity to the mica board frame 200 when the heater wire 202 is wound about the frame 200. A thermofuse 208 is provided to cut-off power in case of dangerous overheating of the resistor heater 18. As shown in FIG. 2, the resistor heater 18 is oriented substantially parallel to the air flow induced by centrifugal impeller 8. However, as is apparent to one skilled the art that a non parallel orientation of the resistor heater may be utilized so that the air flow may be directed around as well as through the resistor heater 18.

Air temperature is sensed by a sensor 34 located inside the duct 42 between impeller 8 and heater 18. The sensor output is fed to the micro-processor which processes the information in conjunction with the selected program and controls heat output so as to maintain the correct temperature during all stages of the process. As is apparent, the sensor 34 may be positioned anywhere along the hot air stream so that accurate and reliable temperature sensing may be obtained.

Further shown in FIG. 4 is a hinge 39 of cover 2 and rubber feet 37 supporting the base compartment 21 as well as the entire bread-making apparatus 100. The hinge 39 is integrally molded with the cover 2 and the housing to permit access to the baking chamber 5.

Additionally, electric controls and timer means for operating the motor and the heater and a micro-processor programmed for different baking modes are provided but not shown, all to be actuated by means of the keyboard 13 and display 14 shown in FIG. 1.

In order to use the bread baking apparatus 100, the user will usually fill the necessary ingredients into the baking pan, close the cover 2 and select the baking mode and the time he or she wishes to have a fresh-baked bread. The apparatus 100 will start mixing and kneading the ingredients into a dough, stop the mixing blade after a pre-designated time period and let the dough rise at a medium temperature. It will start the baking process at a time as ordered by the user—say early in the morning—and stop it after the bread is completely baked. As an optional feature, air circulation by both blowers can be continued after the heater has been switched off. This will serve to condense the water out of the moist air and to collect it in the bottom of the baking chamber, thereby preventing the baked bread from becoming soggy.

It should be understood that the preferred embodiments and examples described are for illustrative purposes only and are not to be construed as limiting the scope of the present invention which is properly delineated only in the appended claims.

What is claimed is:

1. An automatic bread making apparatus for mixing and kneading dough, said apparatus comprising:

a housing having an interior surface, a top surface, a bottom, a pair of sidewalls, and a housing opening;

a baking chamber having interior and exterior surfaces, said baking chamber positioned within said housing to form air space between the interior surface of said housing and the exterior surface of said baking chamber, said baking chamber defining an opening, said opening having an openable top cover;

a baking pan made of a heat-conductive material, said baking pan positioned within said baking chamber to define an air space between the interior surface of said baking chamber and said baking pan;

a first impeller configured to supply and circulate heated air to said air space defined between the interior surface of said baking chamber and said baking pan;

a second impeller configured to provide air circulation to said space defined between the interior surface of said housing and the exterior surface of said baking chamber so as to cool said interior surface of said housing;

a bearing housing positioned below said baking chamber for firmly securing said baking pan to said baking chamber, said bearing housing including means for securing said baking pan so as to prevent rotational movement of said baking pan during mixing and kneading, and for permitting removal of said baking pan from said baking chamber, said bearing housing further comprising a shaft extending from said bearing housing into said baking pan; and a double-shaft motor, wherein each of said shafts are oriented along an axis, said axis extending from one of said side walls of said housing to said interior surface of said baking chamber, said double-shaft motor coupled between said interior surface of said housing and said exterior surface of said baking chamber, wherein said first impeller and said second impeller are mounted on opposite ends of said double-shaft motor, said first impeller mounted proximate to said baking chamber wall and said second impeller mounted proximate to said housing.

2. The bread making apparatus of claim 1, further comprising a base portion for supporting said housing and a blower housing secured to the wall of said baking chamber, said blower housing having a duct extending toward said base portion, said first impeller mounted for rotation within said blower housing for directing air through said duct and into said baking chamber.

3. The bread making apparatus of claim 2, further comprising heater means mounted within said duct of said blower housing for heating the air supplied by said first impeller and for providing a hot air stream which surrounds said baking pan.

4. The bread making apparatus of claim 3, wherein said heater means further comprises a resistor heater.

5. The bread making apparatus of claim 4, wherein said resistor heater further comprises a frame, said frame having first and second ends in opposite spaced apart relation, wherein a heater wire is wound from said first end to said second end to form a plurality of resistance wire loops between said opposite first and second ends.

6. The bread making apparatus of claim 3, further comprising a temperature sensor positioned within said hot air stream.

7. The bread making apparatus of claim 6, wherein said temperature sensor is positioned between said first impeller and said heater means.

8. The bread making apparatus of claim 1, further comprising an air inlet grill mounted within said housing and a tubular air inlet duct provided adjacent to said air inlet grill, said second impeller mounted for rotation within said tubular duct air inlet for drawing cool air into said housing.

9. The bread making apparatus of claim 1, further comprising a base portion for supporting said housing, an electric motor coupled to said base portion, said electric motor having a shaft extending toward said base portion, said shaft connected to a first pulley, a second pulley mounted on the downwardly extending shaft of said bearing housing and a drive belt connecting said first and second pulleys.

10. The bread making apparatus of claim 9, further comprising a mixing and kneading blade mounted for rotation within said baking pan, said blade being releasably mounted from said shaft connected to said first pulley.

11. The bread making apparatus of claim 1, further comprising an inwardly extending frame mounted about said housing opening, said frame fabricated from a material of low heat conductivity.

12. The bread making apparatus of claim 1, wherein said top surface of said housing defines a downwardly sloping top portion.

13. The bread making apparatus of claim 1, wherein said housing is fabricated out of a plastic material.

14. The bread making apparatus of claim 13, wherein said plastic material is polypropylene.

15. The bread making apparatus of claim 1, further comprising an electric control means, a processor means and a timer means, said electric control means, said processor means and said timer means positioned within said housing, wherein cool air is drawn by said second impeller over and through said electric control means, said processor means and timer means for cooling purposes.

16. The bread making apparatus of claim 1, wherein said baking chamber is made of metal sheeting.

17. The bread making apparatus of claim 1, wherein said first impeller is a centrifugal impeller.

18. The bread making apparatus of claim 1, wherein said second impeller is an axial impeller.

19. The bread making apparatus of claim 1, further comprising a base portion for supporting said housing, an electric motor coupled to said base portion, and torque transferring means for transferring torque from said electric motor to a mixing and kneading blade positioned within said baking pan.

20. The bread making apparatus of claim 1, further comprising a transparent cover attached to said top surface of said housing to permit viewing of said bread making.

21. The bread making apparatus of claim 20, wherein said transparent cover is hingedly attached to said top surface of said housing so as to permit opening and closing of said transparent cover.

\* \* \* \* \*